United States Patent [19]

Vyse

[11] Patent Number: 4,906,031

[45] Date of Patent: Mar. 6, 1990

[54] QUICK CONNECT COUPLING WITH GARTER SPRING

[75] Inventor: Gerrard N. Vyse, Bedford, Tex.

[73] Assignee: Stratoflex, Inc., Fort Worth, Tex.

[21] Appl. No.: 222,039

[22] Filed: Jul. 21, 1988

[51] Int. Cl.$^4$ ............................................. F16L 37/22
[52] U.S. Cl. ...................................... 285/318; 285/305
[58] Field of Search ............... 285/305, 318, 321, 348; 267/167

[56] References Cited

U.S. PATENT DOCUMENTS

| | | | |
|---|---|---|---|
| 2,693,378 | 11/1954 | Beyer | 285/5 |
| 2,846,240 | 8/1958 | Beyer | 285/318 |
| 2,922,665 | 1/1960 | Beyer | 285/318 |
| 3,479,068 | 11/1969 | Brittain | 285/321 |
| 3,540,760 | 11/1970 | Miller | 285/354 |
| 3,574,359 | 4/1971 | Klein | 285/305 |
| 4,055,359 | 10/1977 | McWethy | 285/318 |
| 4,063,760 | 12/1977 | Moreiras | 285/321 |
| 4,138,146 | 2/1979 | Rumble | 285/321 |
| 4,376,525 | 3/1983 | Fremy | 285/316 |
| 4,401,326 | 8/1983 | Blair | 285/318 |
| 4,565,392 | 1/1986 | Vyse | 285/321 |
| 4,645,245 | 2/1987 | Cunningham | 285/321 |

FOREIGN PATENT DOCUMENTS 569915 11/1975 Switzerland ..................... 285/305

*Primary Examiner*—Randolph A. Reese
*Assistant Examiner*—Anthony Knight
*Attorney, Agent, or Firm*—Marshall, O'Toole, Gerstein, Murray & Bicknell

[57] ABSTRACT

A coupling comprising an outer socket or receptacle part having an internal opening, and a nipple or insert part which is sized to be inserted into the opening of the receptacle part. The receptacle and insert parts are provided with outer and inner lock ring grooves, respectively, which are substantially aligned in the radial direction when the parts are assembled. A garter spring is located in and extends between the two grooves when the parts are assembled in order to lock the parts together. The groove of one of the two parts has an arcuate surface and the radius of the surface is substantially the same as the radius of the coils of the spring, whereby the arcuate surface supports the coils and retards flattening of the coils. The groove of the other of the two parts has a surface which overlies the spring and holds the spring in place in the grooves even if the spring should break.

3 Claims, 2 Drawing Sheets

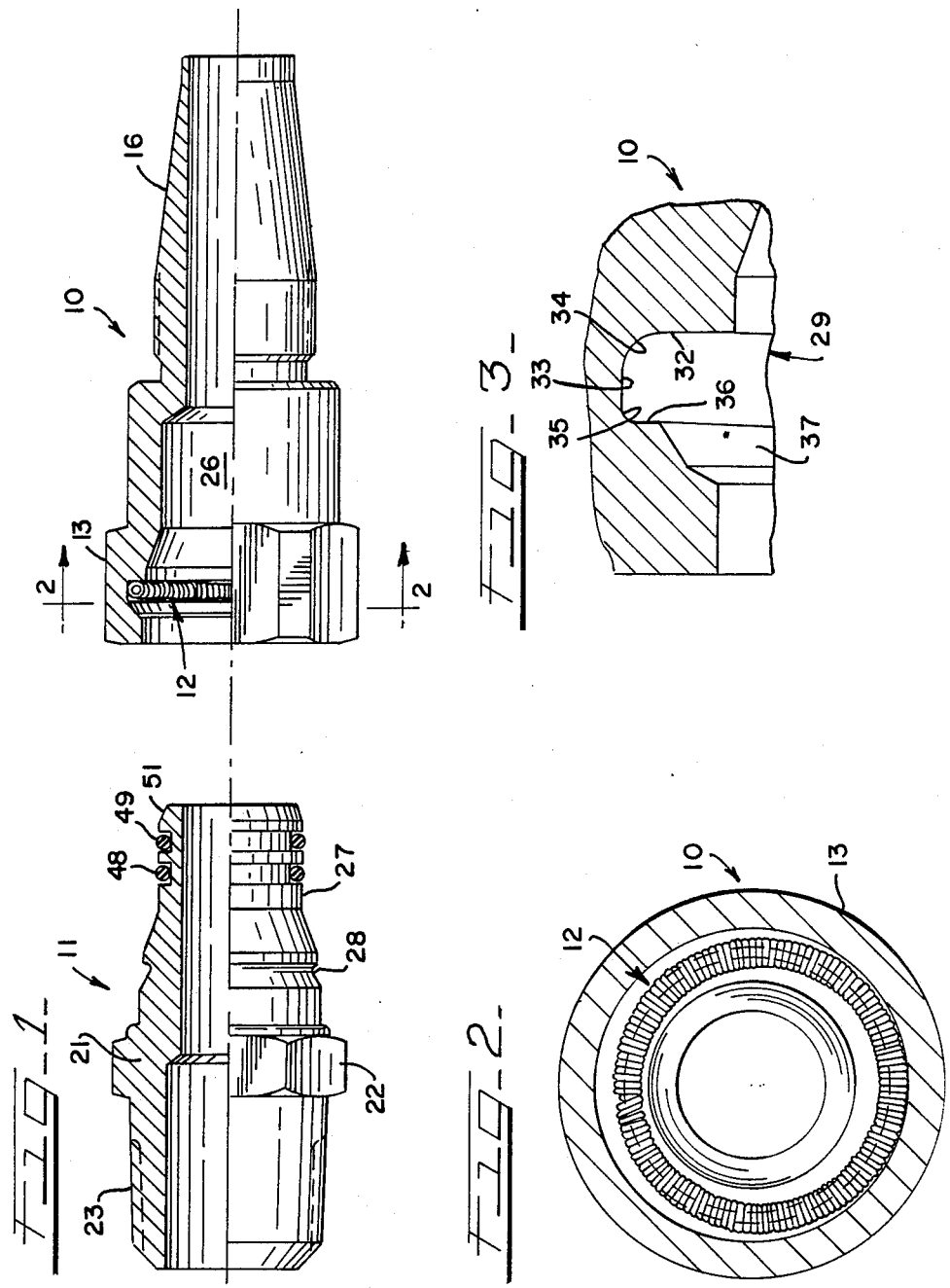

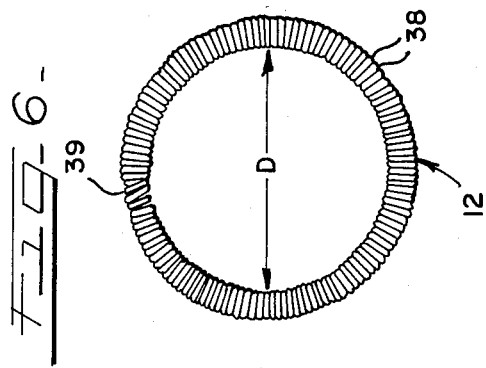
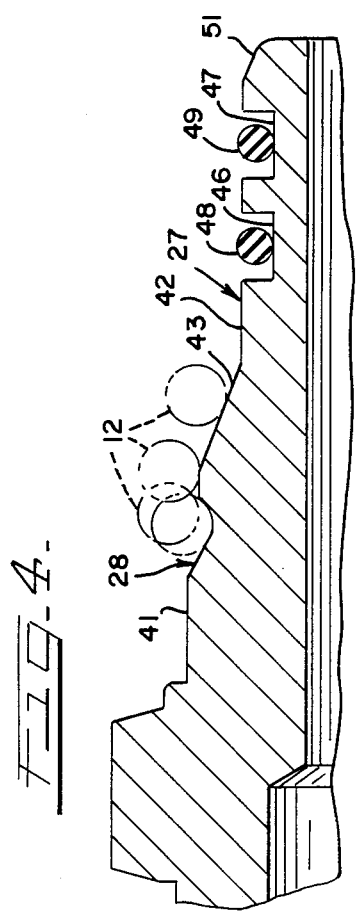
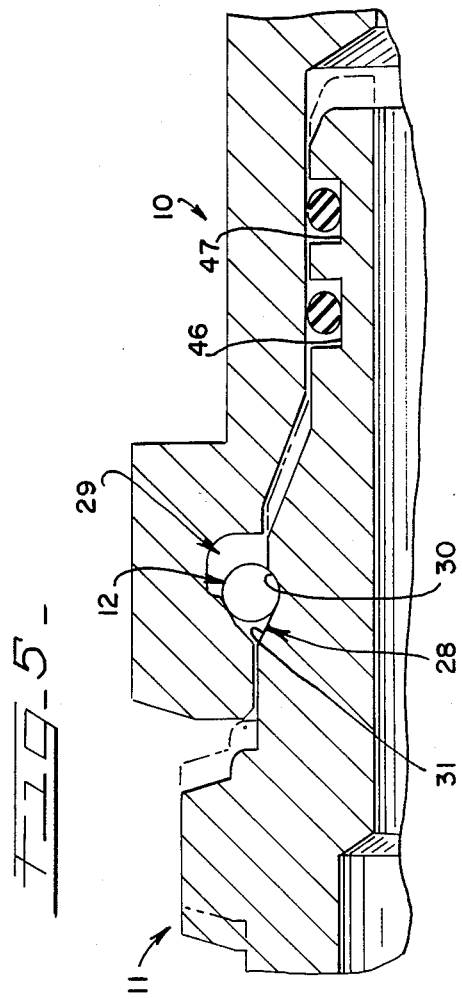

QUICK CONNECT COUPLING WITH GARTER SPRING

FIELD AND BACKGROUND OF THE INVENTION

Quick connect couplings or fittings are well known in the art and various types are described in U.S. patents. For example, U.S. Pat. Nos. 4,565,392, 4,063,760, 3,540,760 and 3,479,068 disclose couplings of this general type, which are attached to metal tubes or flexible hoses for making fluid connections. In such a coupling, a tubular nipple part is inserted into a tubular socket part, and a resilient O-ring extends between the two parts and forms a seal. Upon insertion, the two parts become locked in assembled relation by a split lock ring or snap ring which is located in radially aligned lock grooves formed in the two parts. Prior to the assembly of the two parts, the snap ring is loosely positioned in the lock groove of the outer socket. When the nipple is inserted into the socket, the forward end of the nipple passes through and expands the snap ring, and the assembly is completed when the snap ring "snaps" into the lock groove of the nipple. The snap ring then extends into both grooves, thereby locking the parts together.

Couplings of this character have been used, for example, in making hydraulic connections in automobiles and trucks, such as the connections between the engine block and an oil cooler. An automobile or truck is constructed on a moving assembly line, and workers at stations along the line make the connections while the line is moving. It is, of course, very important, because the line moves continuously, that the socket and the nipple be securely connected together very easily and rapidly. There have been instances where the cut ends of a split snap ring have snagged on the insert part during assembly and increased the time required to make a secure connection.

Quick connect couplings have also been provided which include an annular garter spring in place of a split snap ring. Examples of such couplings are shown in U.S. Pat. Nos. 2,693,378, 4,055,359, 4,376,525 and 4,401,326. See also Canadian patent No. 637,102. While a garter spring has an advantage over a split ring in that it does not have ends which may catch on the nipple part during assembly of the coupling, this advantage has been offset by other disadvantages in prior art fittings. These disadvantages are derived from that fact that a garter spring is formed by a coiled small diameter wire which has its ends connected together to form an endless loop. The connected ends of the wire may come loose or the thin wire may break at some other point during use, thereby releasing the locked connection between the coupling parts. Further, if the internal fluid pressure in a coupling is very high, the coils of the wire may flatten sufficiently that the coupling parts may become disconnected.

It is a general object of the present invention to provide an improved quick connect coupling including a garter spring, which avoids the foregoing disadvantages.

SUMMARY OF THE INVENTION

A coupling in accordance with this invention comprises an outer socket or receptacle part having an internal opening, and a nipple or insert part which is sized to be inserted into the opening of the receptacle part. The receptacle and insert parts are provided with outer and inner lock ring grooves, respectively, which are substantially aligned in the radial direction when the parts are assembled. A garter spring is located in and extends between the two grooves when the parts are assembled in order to lock the parts together. The groove of one of the two parts has an arcuate surface and the radius of the surface is substantially the same as the radius of a coil of the spring, whereby the arcuate surface supports the coils and retards flattening of the coils. The groove of the other of the two parts has a surface which overlies the spring and holds the spring in place in the grooves even if the spring should break.

BRIEF DESCRIPTION OF THE DRAWINGS

The invention will be better understood from the following detailed description taken in conjunction with the accompanying drawing, wherein:

FIG. 1 is an exploded view partially in section showing a coupling in accordance with the present invention;

FIG. 2 a sectional view taken on the line 2—2 of

FIG. 3 is an enlarged fragmentary view of a portion of the structure shown in FIG. 1;

FIGS. 4 and 5 are fragmentary sectional views showing the parts during assembly; and FIG. 6 is a view of a garter spring of the coupling.

DETAILED DESCRIPTION OF THE DRAWINGS

With reference to FIG. 1, the coupling includes an external receptacle or socket 10, an internal insert or nipple 11, and a garter spring 12. The socket 10 includes a main body part 13 that has a tubular configuration and may have a hexagonal outer configuration so that it may be readily gripped by a wrench. The right-hand end 16, as seen in FIG. 1, of the socket 10 may be configured to be attached to various devices such as a metal housing, a metal tube, or a hose, for example. In the present illustration, the end 16 of the socket 10 is designed to be attached to a flexible hose (not shown).

The nipple 11 includes a tubular body part 21 that has a hexagonal section 22 formed thereon so that it may be gripped by a wrench. The left-hand end 23, as seen in FIG. 1, may also be configured to be attached to various devices (not shown) such as a housing, a tube or a hose.

The socket 10 has an internal stepped bore indicated by the numeral 26 and the nipple 11 has an external stepped outer surface indicated by the numeral 27. With reference to FIGS. 1, 4 and 5, a lock spring nipple groove 28 is formed in the stepped surface 27 of the nipple 11, and a lock spring socket groove 29 is formed in the bore 26 of the socket 10. As shown in FIG. 5, when the socket and the nipple are fully assembled, the two grooves 28 and 29 are generally in radial alignment. The spring 12 is positioned in the two grooves 28 and 29 when the parts are assembled and approximately one-half the radial width of the spring 12 extends into each of the grooves 28 and 29 and prevents the parts from being disconnected.

With specific reference to FIGS. 4 and 5, the nipple groove 28 has an arcuate bottom surface portion 30 and a slanted surface portion 31 which tapers radially outwardly and toward the left as seen in these figures. The socket groove 29 (best shown in FIG. 3) has a radially extending surface portion 32 at its right side, and an axially extending surface 33 at the bottom of the groove. The corners 34 and 35 at the bottom of the groove are curved. The left side of the groove includes a radially extending portion 36 and a slanted portion 37.

The garter spring 12 is formed by a wire which is turned to form a plurality of closely spaced coils 38 (FIG. 6). The ends of the coiled wire are connected together in the portion indicated by the numeral 39. An extension spring having interlocking ends and sold by the Associated Spring Company is suitable for this purpose. As shown in FIGS. 4 and 5, the radius of the surface 30 of the nipple groove 28 is made equal to the radius of the coils 38 of the spring 12. Further, the interior diameter of the spring 12 when in its relaxed or unexpanded state is substantially equal to the diameter of the nipple at the bottom of the groove 28.

Prior to assembly of the nipple 11 with the socket 10, the spring 12 is positioned in the groove 29 of the socket, and the spring 12 fits loosely in the groove 29 as shown in FIGS. 1 and 2.

With reference to FIG. 4, the stepped outer surface 27 of the nipple 11 includes an enlarged cylindrical part 41 wherein the groove 28 is formed, a reduced diameter cylindrical part 42 at the right-hand or forward end of the nipple, and a ramped or slanted surface 43 between the surfaces 41 and 42. The diameter of the surface 42 is less than the internal diameter D of the spring 12. As the nipple 11 is assembled with the socket 10 and the spring 12, the forward or right-hand end of the nipple 11 is moved toward the right as seen in FIGS. 1 and 5 and the forward end extends through the spring 12. The diameter of the enlarged surface 41 is greater than the relaxed diameter D of the spring 12 when in its normal or unflexed state, and consequently the ramp 43 engages the spring 12. As the nipple is pressed into the socket, radial surface 32 of the socket groove 29 pushes the spring up the ramp 43, and the ramp 43 expands the spring 112 into the outer part of the socket groove 29. The spring 12 rides on the outer or enlarged surface 41 until the spring falls or snaps into the nipple groove 28. The socket and the nipple are then, of course, fully and permanently assembled, as shown in FIG. 4. The dashed circular lines in FIG. 4 show the path of the spring as the coupling is being assembled.

The configuration of the bore 26 of the socket generally conforms to the outer surface 27 of the nipple 11. To seal the connection between the socket and the nipple, two seal grooves 46 and 47 are formed in the outer surface 42 adjacent the forward end of the nipple, and two O-rings 48 and 49 are mounted in the grooves 46 and 47. As shown in FIG. 5, the O-rings engage the bore 26 of the socket 10 and form seals between these parts.

The outer corner of the nipple 11, at the right-hand end, is preferably slanted or beveled as indicated at 51 to facilitate insertion of the nipple into the socket 10.

When the parts are assembled as shown in FIG. 5, the spring 12 is seated at the bottom of the groove 28 and the slanted surface 37 of the socket groove 29 engages and partially overlies the radially outer surface of the spring 12. The arcuate surface 30 of the nipple is at the right-hand or forward side of the nipple groove 28, whereas the slanted surface 37 is at the left-hand or rearward side of the socket groove 29. When the coupling is in use and there is an internal fluid under pressure within the fitting, the pressure tends to move the nipple 11 toward the left relative to the socket 10. Thus the internal pressure would move the parts to the position shown in FIG. 5. In this position the slanted surface 37 presses the spring 12 radially inwardly and forwardly in the tight engagement with the arcuate surface 30. Since the surface 30 has substantially the same curvature as that of the outer surface of the coils 38, the surface 30 causes the coils to retain their circular shape under pressure, and thereby prevents the coils from flattening when the internal pressure is high.

Further, since the slanted surface 37 partially overlies the spring, it holds the spring in place and causes it to retain its shape even if the ends of the spring should come apart or the wire should break. In the specific example illustrated, the surface 37 makes an angle of 27° with the axis of the socket 10, and the angle should be within the range of about 25° to 30°. If the angle is too small, the surface 37 would tend to ride over the top of the spring, and if it is too great, the surface 37 would tend to push the spring forwardly out of the groove 28.

The surface 37 would hold the spring 12 in place even if it should break both when the fitting is under internal pressure and when there is no internal pressure. When the pressure is present, the parts are held tightly in the positions shown in FIG. 5 and the spring cannot escape. When the pressure is released, there will be virtually no movement of the nipple 11 into the socket 10; the only movement would be that caused by the relaxation of the spring 12 when the pressure is released and the spring coils resume their normal circular shape. But since there is virtually no flattening of the coils because of the arcuate surface 30 as previously explained, the amount of relaxation movement of the coils will be minuscule. As a consequence, the parts will remain essentially in the positions shown in FIG. 5 even in the absence of internal pressure, and the surface 37 will hold a broken spring in place and the coupling will remain functional.

The tendency of a broken spring to straighten out would not exert sufficient force to move the nipple into the socket, because the mass of the spring is only a small fraction of the mass of the socket 10. Further, the friction produced by the two O-rings 48 and 49 would also help to prevent such movement.

It will be apparent, therefore, that a novel and useful coupling has been provided. The coupling parts are easily assembled because the garter spring 12 does not have ends which might catch on the nipple, and the spring easily rolls up the ramp 43 during assembly. The arcuate surface 30 restrains the coils from flattening, and the lack of flattening and the resultant lack of relaxation movement of the nipple into the socket, cooperates with the slanted surface 37 to hold the spring in place even if it should break. The two O-rings provide double insurance against leakage and they also restrain relative movement of the nipple and the socket.

What is claimed is:
1. A quick connect coupling comprising:
   (a) an outer receptacle means having an internal opening and an annular outer groove formed in the inner surface of said opening;
   (b) an inner insert means having an annular inner groove formed in the outer surface thereof;
   (c) said receptacle means being adapted to be assembled with said insert means in a position where said insert means is in said opening and said inner and outer grooves are substantially radially aligned;
   (d) a contractible garter spring having interconnected ends positioned in said outer groove prior to said assembly and extending between said inner and outer grooves after said assembly, said garter spring being formed by a series of compressible circular coils; and (e) the bottom of said inner groove having an arcuate side which has substantially the same radius as the radius of said coils of said spring, and said outer groove including a slanted side which at least partially overlies said spring, each of said grooves having a forward end and a rearward end, said arcuate side being adjacent said forward end of said inner groove and said slanted side being adjacent said rearward end of said outer groove, said slanted side forcing said spring coils against said arcuate side when said insert means tends to move out of said receptacle means due to internal pressure.

2. Apparatus as set forth in claim 1, and further including two axially spaced O-ring seals between said receptacle means and said insert means.

3. A quick connect coupling comprising:
(a) an outer receptacle means having an internal opening and an annular outer groove formed in the inner surface of said opening;
(b) an inner insert means having an annular inner groove formed in the outer surface thereof;
(c) said receptacle means being adapted to be assembled with said insert means in a position where said insert means is in said opening and said inner and outer grooves are substantially radially aligned;
(d) a garter spring positioned in said outer groove prior to said assembly and extending between said inner and outer grooves after said assembly, said garter spring being formed by a series of circular coils; and
(e) the bottom of said inner groove having an arcuate side which has substantially the same radius as the radius of said coils of said spring, and said outer groove including a slanted side which at least partially overlies said spring, each of said grooves having a forward end and a rearward end, said arcuate side being adjacent said forward end of said inner groove and said slanted side being adjacent said rearward end of said outer groove, said slanted side forcing said spring coils against said arcuate side when said insert means tends to move out of said receptacle means, said coupling having a longitudinal axis, and said slanted side of said outer groove making an angle substantially in the range of from 25° to 30° with said axis.

* * * * *